US010377065B1

(12) United States Patent
Hill

(10) Patent No.: US 10,377,065 B1
(45) Date of Patent: Aug. 13, 2019

(54) METHOD FOR PRODUCING BUILDING PANELS BY MAKING COATED FOAM IN SITU IN A MOLD

(71) Applicant: Boral IP Holdings (Australia) Pty Limited., North Sydney (AU)

(72) Inventor: Russell Hill, San Antonio, TX (US)

(73) Assignee: Boral IP Holdings (Australia) Pty Limited, North Sydney (AU)

( * ) Notice: Subject to any disclaimer, the term of this patent is extended or adjusted under 35 U.S.C. 154(b) by 0 days.

(21) Appl. No.: 15/074,596

(22) Filed: Mar. 18, 2016

(51) Int. Cl.
| B29C 44/30 | (2006.01) |
| B29C 44/34 | (2006.01) |
| B29K 105/04 | (2006.01) |
| B29K 105/16 | (2006.01) |
| B29K 509/00 | (2006.01) |
| B29K 75/00 | (2006.01) |
| B29L 7/00 | (2006.01) |
| B32B 3/26 | (2006.01) |
| B32B 5/16 | (2006.01) |
| B32B 5/20 | (2006.01) |
| E04F 19/00 | (2006.01) |

(52) U.S. Cl.
CPC ............ *B29C 44/355* (2013.01); *B29C 44/30* (2013.01); *B32B 3/263* (2013.01); *B32B 5/16* (2013.01); *B32B 5/20* (2013.01); *E04F 19/00* (2013.01); *B29K 2075/00* (2013.01); *B29K 2105/04* (2013.01); *B29K 2105/16* (2013.01); *B29K 2509/00* (2013.01); *B29L 2007/002* (2013.01); *B32B 2250/02* (2013.01); *B32B 2260/025* (2013.01); *B32B 2260/046* (2013.01); *B32B 2264/10* (2013.01); *B32B 2266/0214* (2013.01); *B32B 2419/00* (2013.01); *E04F 2203/00* (2013.01)

(58) Field of Classification Search
CPC ........ B29C 44/355; B29C 44/30; E04F 19/00; E04F 2203/00; B32B 5/16; B32B 5/20; B32B 3/263; B32B 2266/0214; B32B 2260/046; B32B 2264/10; B32B 2260/025; B32B 2250/02; B32B 2419/00; B29K 2105/16; B29K 2509/00; B29K 2105/04; B29K 2075/00; B29L 2007/002
See application file for complete search history.

(56) References Cited

U.S. PATENT DOCUMENTS

| 3,236,895 A | 2/1966 | Lee et al. |
| 3,616,171 A * | 10/1971 | Hoskinson, Sr. .... A47C 27/086 428/300.7 |
| 3,859,401 A * | 1/1975 | Gallap ................ B29C 44/3415 264/253 |
| 4,062,999 A | 12/1977 | Kondo et al. |
| 4,883,826 A | 11/1989 | Marugg et al. |
| 5,064,876 A | 11/1991 | Hamada et al. |
| 5,082,738 A | 1/1992 | Swofford |
| 6,168,735 B1 * | 1/2001 | Wang .................... B29C 44/569 264/257 |
| 6,451,231 B1 | 9/2002 | Harrison |
| 6,602,379 B2 | 8/2003 | Li et al. |
| 6,875,500 B2 * | 4/2005 | McGrath, Jr. ........ C09D 175/04 428/142 |
| 7,344,666 B2 | 3/2008 | Cowelchuk |
| 8,083,979 B2 | 12/2011 | Hayes et al. |
| 8,353,144 B2 | 1/2013 | Bolin |
| 8,431,054 B2 | 4/2013 | Pervan |
| 8,992,813 B2 | 3/2015 | Robbins |
| 2002/0160680 A1 * | 10/2002 | Laurence ................ B32B 27/36 442/394 |
| 2003/0096123 A1 * | 5/2003 | Yeager .................. C08F 283/08 428/461 |
| 2003/0108757 A1 | 6/2003 | Hovatter |
| 2004/0068950 A1 * | 4/2004 | McGrath, Jr. ........ C09D 175/04 52/403.1 |
| 2007/0237926 A1 * | 10/2007 | Hall ........................ D06N 3/06 428/143 |
| 2008/0050571 A1 * | 2/2008 | Haque ...................... B32B 5/06 428/219 |
| 2008/0176039 A1 | 7/2008 | Chen |
| 2008/0236718 A1 * | 10/2008 | Shortland ................ D06N 3/06 156/60 |
| 2009/0308001 A1 * | 12/2009 | Wu ........................ E04B 1/762 52/173.3 |

(Continued)

FOREIGN PATENT DOCUMENTS

| CN | 104652741 | 5/2015 |
| EP | 1840178 A1 | 10/2007 |

(Continued)

OTHER PUBLICATIONS

Gunter Oertel; Polyurethane Handbook: Chemistry, Raw Materials, Processing, Application, Properties, 2nd Edition; pp. 17-21; Hanser/Gardner Publications, Inc.; Cincinnati, OH.

(Continued)

*Primary Examiner* — Nathan L Van Sell
(74) *Attorney, Agent, or Firm* — Bookoff McAndrews, PLLC

(57) ABSTRACT

Disclosed herein are composite building materials having at least one textured surface. The textured surface includes at least a plurality of particles. The textured surface closely mimics conventional building materials. The building materials can contain an image printed using ink jet printing methods with inks optimized for enhanced color stability.

40 Claims, No Drawings

(56) References Cited

U.S. PATENT DOCUMENTS

| | | | |
|---|---|---|---|
| 2011/0059238 A1* | 3/2011 | Nasatti | B44C 5/04 |
| | | | 427/209 |
| 2011/0150661 A1* | 6/2011 | Robbins | B29C 70/086 |
| | | | 416/230 |
| 2011/0250404 A1 | 10/2011 | Pervan | |
| 2011/0262701 A1 | 10/2011 | Albertelli | |
| 2011/0262721 A1* | 10/2011 | Albertelli | B29C 70/086 |
| | | | 428/196 |
| 2012/0168986 A1* | 7/2012 | Warnshuis | C08K 5/14 |
| | | | 264/328.1 |
| 2012/0189838 A1* | 7/2012 | Pellacani | B32B 5/20 |
| | | | 428/314.4 |
| 2014/0069050 A1 | 3/2014 | Bolin | |
| 2014/0144583 A1 | 5/2014 | Hakansson | |
| 2015/0037501 A1 | 2/2015 | Ventura et al. | |
| 2015/0267029 A1* | 9/2015 | Hill | C08K 3/0033 |
| | | | 524/785 |
| 2018/0022135 A1 | 1/2018 | Bollström et al. | |

FOREIGN PATENT DOCUMENTS

| | | | | |
|---|---|---|---|---|
| EP | 2159269 A1 | 3/2010 | | |
| KR | 100542966 | 1/2006 | | |
| WO | 2006126189 A1 | 11/2006 | | |
| WO | WO-2014168633 A1 * | 10/2014 | | C08K 3/0033 |

OTHER PUBLICATIONS

U.S. Appl. No. 15/074,538, filed Mar. 18, 2016 (34 pages, including specification, abstract, and claims).

* cited by examiner

METHOD FOR PRODUCING BUILDING PANELS BY MAKING COATED FOAM IN SITU IN A MOLD

FIELD OF THE DISCLOSURE

The present disclosure is directed to composite panels having at least one textured surface, methods of making the same, and methods of printing durable images onto textured composites.

BACKGROUND OF THE DISCLOSURE

Polymeric composites that contain organic and/or inorganic filler materials have been employed in a variety of contexts, especially building materials, because of their excellent mechanical properties and weathering stability. In contrast to conventional building materials, such as brick and stone, composites are lightweight, easily transported and assembled into larger structures. However, such composites are often considered less appealing aesthetically when compared with conventional materials such a stone, brick, wood, and the like. In particular, composites and molded articles typically have uniform surfaces, lacking the various textures and random imperfections found in conventional materials. Furthermore, different building materials can have substantially different textures. For instance, marble is smooth to the touch, whereas stone and brick should feel rough.

Previous attempts to impart textures onto composite surfaces include application of binder material in combination with large excesses of particles such as pigments and/or sand to the surface of a composite. However, in such processes it can be difficult to obtain a complex multi-colored image, as well as to remove the excess particles. Complex images can be imparted onto composites surfaces by hand painting, however, such processes are laborious, slow, and ill-suited for commercial manufacturing.

There is a need for building materials that combine the mechanical and practical advantages of composites with the aesthetic look and feel of natural materials. There is a need for improved composites having complex, color-fast images. The compositions and methods described herein address these and other needs.

SUMMARY OF THE DISCLOSURE

Disclosed herein are various composite panels and methods of making composite panels. In some embodiments, the composite can include a polymeric substrate having at least one textured surface. The surface contains a plurality of particles covering, embedded into or protruding from the surface. The textured surface can also include one or more binders, adhesives, and the like. Suitable polymeric substrates include those made, at least in part, from a thermoset foam. Exemplary thermosets include polyurethanes, polyisocyanurates, epoxies, vinyl esters, ethylene-vinyl acetate (EVA) copolymers, polyesters, polyimides, polyoxybenzylmethylenglycolanhydrides (e.g., Bakelite), phenolics (e.g., Duroplast), acrylics, and mixtures thereof. Also provided herein are methods of making composites having at least one textured surface. In certain embodiments, the textured composite is made by:

a) providing a mold;
b) introducing a first plurality of particles to at least one surface of the mold;
c) introducing a foamable composition into the mold; and
d) allowing the foamable composition to foam within the mold.

In certain embodiments, binders and other components may be introduced to the mold before the foamable composition is added. The binder may be added at the same time or sequentially before or after the particles. The binder may be added as a separate composition from the particles, or the binder may be admixed with the particles and the mixture added to the mold. Composites having more than one textured surface may be obtained by adding a second plurality of particles (along with binders and the like) after the foamable composition has been added to the mold, but before it has fully foamed. The second plurality of particles can be the same or different from the first plurality of particles.

The processes disclosed herein can be carried out using any conventional mold, including box molds and continuous molds.

In certain embodiments are provided polymeric composites having at least one a textured surface with a printed image. In some embodiments are provided methods of printing an image onto the textured surface containing particles using an ink that contains least one inorganic pigment, The image can be printed by dispensing the liquid ink through an ink jet printer onto the textured surface and then bonding the inorganic pigment with the particles. The bonding can be accomplished using heat, pressure, or a combination thereof.

In certain embodiments, the ink is dispensed with sufficient pressure from the printer to penetrate the plurality of particles and coat at least a portion of the coating layer.

In some embodiments, it is preferred that the textured surface contains at least one coating layer that contains a resin. Exemplary coating materials include polyurethanes, polyisocyanurates, epoxies, vinyl esters, ethylene-vinyl acetate (EVA) copolymers, polyesters, polyimides, polyoxybenzylmethylenglycolanhydrides (e.g., Bakelite), phenolics (e.g., Duroplast), acrylics, and mixtures thereof. The resin can be obtained from a sheet molding compound (SMC). In some embodiments, the coating layer can contain at least one UV-curable resin or microwave-curable resin. The printed image can correspond to a variety of building materials, for instance natural stone, brick, stucco, wood, gypsum, slate, marble, concrete, or tile. In other instances the printed image can correspond to an image such as a painting, a fresco, a mural, a logo and the like. The printed images have enhanced color stability.

DETAILED DESCRIPTION

Disclosed herein are various composites and methods of making composite panels. In some embodiments, the composite panel can include a substrate with at least one textured surface. The textured surface can include a plurality of particles. In some embodiments, the particles are coated on, protruding from, and/or embedded into, the textured surface. In some embodiments, the composite can have at least one texture surface bearing an image that is applied via ink jet printing.

Substrates

The substrate can include one or more molded articles, including thermosets (e.g., thermoset foams). Suitable thermosets include, for instance, polyurethanes, polyisocyanurates, epoxies, vinyl esters, ethylene-vinyl acetate (EVA) copolymers, polyesters, polyimides, polyoxybenzylmethylenglycolanhydrides (e.g., Bakelite), phenolics (e.g., Duroplast), acrylics, and mixtures thereof. In certain preferred embodiments, the thermoset includes a thermoset composite that includes filler and/or fibers. In some embodiments, the thermoset composite is a polyurethane composite. The polyurethane composites can comprise a polyurethane formed, for instance, from reactive systems such as reactive polyols and isocyanates.

Isocyanates suitable for use in the polyurethane composites described herein include one or more monomeric or oligomeric poly- or di-isocyanates. The monomeric or oligomeric poly- or di-isocyanate include aromatic diisocyanates and polyisocyanates. The isocyanates can also be blocked isocyanates or pre-polymer isocyanates. An example of a useful diisocyanate is methylene diphenyl diisocyanate (MDI). Useful MDI's include MDI monomers, MDI oligomers, and mixtures thereof.

Further examples of useful isocyanates include those having NCO (i.e., the reactive group of an isocyanate) contents ranging from about 25% to about 35% by weight. Examples of useful isocyanates are found, for example, in *Polyurethane Handbook: Chemistry, Raw Materials, Processing Application, Properties,* 2nd Edition, Ed: Gunter Oertel; Hanser/Gardner Publications, Inc., Cincinnati, Ohio, which is herein incorporated by reference. Suitable examples of aromatic polyisocyanates include 2,4- or 2,6-toluene diisocyanate, including mixtures thereof; p-phenylene diisocyanate; tetramethylene and hexamethylene diisocyanates; 4,4-dicyclohexylmethane diisocyanate; isophorone diisocyanate; 4,4-phenylmethane diisocyanate; polymethylene polyphenylisocyanate; and mixtures thereof. In addition, triisocyanates may be used, for example, 4,4,4-triphenylmethane triisocyanate; 1,2,4-benzene triisocyanate; polymethylene polyphenyl polyisocyanate; methylene polyphenyl polyisocyanate; and mixtures thereof. Suitable blocked isocyanates are formed by the treatment of the isocyanates described herein with a blocking agent (e.g., diethyl malonate, 3,5-dimethylpyrazole, methylethylketoxime, and caprolactam). Isocyanates are commercially available, for example, from Bayer Corporation (Pittsburgh, Pa.) under the trademarks MONDUR and DESMODUR. Other examples of suitable isocyanates include MONDUR MR Light (Bayer Corporation; Pittsburgh, Pa.), PAPI 27 (Dow Chemical Company; Midland, Mich.), Lupranate M20 (BASF Corporation; Florham Park, N.J.), Lupranate M70L (BASF Corporation; Florham Park, N.J.), Rubinate M (Huntsman Polyurethanes; Geismar, La.), Econate 31 (Ecopur Industries), and derivatives thereof.

The average functionality of isocyanates useful with the composites described herein can be between about 1.5 to about 5. Further, examples of useful isocyanates include isocyanates with an average functionality of about 2 to about 4.5, about 2.2 to about 4, about 2.4 to about 3.7, about 2.6 to about 3.4, and about 2.8 to about 3.2.

As indicated herein, the composites include one or more polyols. The one or more polyols for use in the polyurethane composite can include polyester polyols, polyether polyols, or combinations thereof. In some embodiments, the one or more polyols can include 50% or more of one or more highly reactive (i.e., first) polyols. For example, the one or more polyols can include greater than 55%, greater than 60%, greater than 65%, greater than 70%, greater than 75%, greater than 80%, greater than 85%, greater than 90%, greater than 95%, or 100% of one or more highly reactive polyols.

In some embodiments, the one or more highly reactive polyols can include polyols having a hydroxyl number of greater than 250. For example, the hydroxyl number can be greater than 275, greater than 300, greater than 325, greater than 350, greater than 375, greater than 400, greater than 425, greater than 450, greater than 475, greater than 500, greater than 525, greater than 550, greater than 575, greater than 600, greater than 625, greater than 650, greater than 675, greater than 700, greater than 725, or greater than 750.

In some embodiments, the one or more highly reactive polyols can include polyols having a primary hydroxyl number of greater than 250. As used herein, the primary hydroxyl number is defined as the hydroxyl number multiplied by the percentage of primary hydroxyl groups based on the total number of hydroxyl groups in the polyol. For example, the primary hydroxyl number can be greater than 255, greater than 260, greater than 265, greater than 270, greater than 275, greater than 280, greater than 285, greater than 290, or greater than 295.

In some embodiments, the one or more highly reactive polyols include a large number of primary hydroxyl groups (e.g. 75% or more) based on the total number of hydroxyl groups in the polyol. For example, the highly reactive polyols can include 80% or more, 85% or more, 90% or more, 95% or more, or 100% of primary hydroxyl groups. The number of primary hydroxyl groups can be determined using fluorine NMR spectroscopy as described in ASTM D4273, which is hereby incorporated by reference in its entirety.

In some embodiments, the one or more highly reactive polyols can include a Mannich polyol. Mannich polyols are the condensation product of a substituted or unsubstituted phenol, an alkanolamine, and formaldehyde. Mannich polyols can be prepared using methods known in the art. For example, Mannich polyols can be prepared by premixing the phenolic compound with a desired amount of the alkanolamine, and then slowly adding formaldehyde to the mixture at a temperature below the temperature of Novolak formation. At the end of the reaction, water is stripped from the reaction mixture to provide a Mannich base. See, for example, U.S. Pat. No. 4,883,826, which is incorporated herein by reference in its entirety. The Mannich base can then be alkoxylated to provide a Mannich polyol.

The substituted or unsubstituted phenol can include one or more phenolic hydroxyl groups. In certain embodiments, the substituted or unsubstituted phenol includes a single hydroxyl group bound to a carbon in an aromatic ring. The phenol can be substituted with substituents which do not undesirably react under the conditions of the Mannich condensation reaction, a subsequent alkoxylation reaction (if performed), or the preparation of polyurethanes from the final product. Examples of suitable substituents include alkyl (e.g., a $C_1$-$C_{18}$ alkyl, or a $C_1$-$C_{12}$ alkyl), aryl, alkoxy, phenoxy, halogen, and nitro groups.

Examples of suitable substituted or unsubstituted phenols that can be used to form Mannich polyols include phenol, o-, p-, or m-cresols, ethylphenol, nonylphenol, dodecylphenol, p-phenylphenol, various bisphenols including 2,2-bis(4-hydroxyphenyl)propane (bisphenol A), β-naphthol, β-hydroxyanthracene, p-chlorophenol, o-bromophenol, 2,6-dichlorophenol, p-nitrophenol, 4- or 2-nitro-6-phenylphenol, 2-nitro-6- or 4-methylphenol, 3,5-dimethylphenol, p-isopropylphenol, 2-bromo-6-cyclohexylphenol, and combinations thereof. In some embodiments, the Mannich polyol is derived from phenol or a monoalkyl phenol (e.g., a para-alkyl phenols). In some embodiments, the Mannich polyol is derived from a substituted or unsubstituted phenol selected from the group consisting of phenol, para-n-nonylphenol, and combinations thereof.

The alkanolamine used to produce the Mannich polyol can include a monoalkanolamine, a dialkanolamine, a trialkanolamine, a tetraalkanolamine, or combinations thereof. Examples of suitable monoalkanolamines include methylethanolamine, ethylethanolamine, methylisopropanolamine, ethylisopropanolamine, methyl-2-hydroxybutylamine, phenylethanolamine, ethanolamine, isopropanolamine, and combinations thereof. Exemplary dialkanolamines include diisopropanolamine, ethanolisopropanolamine, ethanol-2-hydroxybutylamine, isopropanol-2-hydroxybutylamine, isopropanol-2-hydroxyhexylamine, ethanol-2-hydroxyhexylamine, and combinations thereof. Exemplary trialkanolamines include three hydroxy-substituted $C_1$-$C_{12}$ alkyl groups (e.g., three hydroxy-substituted $C_1$-$C_8$ alkyl groups, or three hydroxy-substituted $C_1$-$C_6$ alkyl groups). Examples of suitable trialkanolamines include triisopropanolamine, triethanolamine, tris(2-hydroxybutyl)amine, hydroxyethyl di(hydroxypropyl)amine, hydroxypropyl di(hydroxyethyl)amine, tri(hydroxypropyl)amine, or combinations thereof. Exemplary tetraalkanolamines include four hydroxy-substituted $C_1$-$C_{12}$ alkyl groups (e.g., four hydroxy-substituted $C_1$-$C_8$ alkyl groups, or four hydroxy-substituted $C_1$-$C_6$ alkyl groups). In certain embodiments, the alkanolamine is selected from the group consisting of diethanolamine, diisopropanolamine, and combinations thereof.

Any suitable alkylene oxide or combination of alkylene oxides can be used to form the Mannich polyol. In some embodiments, the alkylene oxide is selected from the group consisting of ethylene oxide, propylene oxide, butylene oxide, and combinations thereof. In certain embodiments, the Mannich polyol is alkoxylated with from 100% to about 80% propylene oxide and from 0 to about 20 wt % ethylene oxide.

Mannich polyols are known in the art, and include, for example, ethylene and propylene oxide-capped Mannich polyols sold under the trade names CARPOL® MX-425 and CARPOL® MX-470 (Carpenter Co., Richmond, Va.).

In some embodiments, the one or more first polyols can include an aromatic polyester polyol, an aromatic polyether polyol, or a combination thereof. In some embodiments, the one or more first polyols include an aromatic polyester polyol such as those sold under the TEROL® trademark (e.g., TEROL® 198).

Examples of highly reactive polyols also include Pel-Soy 744 and Pel-Soy P-750, soybean oil based polyols commercially available from Pelron Corporation; Ecopol 122, Ecopol 131 and Ecopol 132, soybean oil polyols formed using polyethylene terephthalate and commercially available from Ecopur Industries; Stepanpol PD-110 LV and PS 2352, polyols based on soybean oil, diethylene glycol and phthallic anhydride and commercially available from Stepan Company; Voranol 280, 360 and WR2000, polyether polyols commercially available from Dow Chemical Company; Honey Bee HB-530, a soybean oil-based polyol commercially available from MCPU Polymer Engineering; Renewpol, commercially available from Styrotech Industries (Brooklyn Park, Minn.); JeffAdd B 650, a 65% bio-based content (using ASTM D6866-06) additive based on soybean oil commercially available from Huntsman Polyurethanes; Jeffol SG 360, a sucrose and glycerin-based polyol commercially available from Huntsman Polyurethanes; and derivatives thereof. For example, Ecopol 131 is a highly reactive aromatic polyester polyol comprising 80% primary hydroxyl groups, a hydroxyl number of 360-380 mg KOH/g, i.e., and a primary hydroxyl number of 288-304 mg KOH/g.

The one or more polyols for use in the polyurethane composites can include one or more plant-based polyols. In some embodiments, the plant-based polyols are highly reactive polyols. The one or more plant-based polyols useful in the polyurethane composites can include polyols containing ester groups that are derived from plant-based fats and oils. Accordingly, the one or more plant-based polyols can contain structural elements of fatty acids and fatty alcohols. Starting materials for the plant-based polyols of the polyurethane component can include fats and/or oils of plant-based origin with preferably unsaturated fatty acid residues. The one or more plant-based polyols useful with the polyurethane composites include, for example, castor oil, coconut oil, corn oil, cottonseed oil, *lesquerella* oil, linseed oil, olive oil, palm oil, palm kernel oil, peanut oil, sunflower oil, tall oil, and mixtures thereof. In some embodiments, the one or more polyols do not include plant-based polyols.

In some embodiments, the one or more polyols include a less reactive polyol. For example, the polyurethane composite can be produced from one or more less reactive polyols in addition to one or more highly reactive polyols. Less reactive polyols can have lower hydroxyl numbers, lower numbers of primary hydroxyl groups and/or lower primary hydroxyl numbers than the highly reactive polyols. In some embodiments, the less reactive polyols can have hydroxyl numbers of less than 250, less than 225, less than 200, less than 175, less than 150, less than 125, less than 100, less than 80, less than 60, less than 40, or even less than 20. In some embodiments, the less reactive polyols have about 50% or less primary hydroxyl groups, about 40% or less primary hydroxyl groups, about 30% or less primary hydroxyl groups, about 20% or less primary hydroxyl groups, or even about 10% or less primary hydroxyl groups. In some embodiments, the less reactive polyols can have primary hydroxyl numbers of less than about 220, less than about 200, less than about 180, less than about 160, less than about 140, less than about 120, less than about 100, less than about 80, less than about 60, less than about 40, or even less than about 20. Suitable less reactive polyols include castor oil; Stepanpol PS-2052A (commercially available from the Stepan Company); Agrol 2.0, 3.6, 4.3, 5.6 and 7.0 (plant-based polyols commercially available from BioBased Technologies); Ecopol 123 and Ecopol 124, which are commercially available from Ecopur Industries; Honey Bee HB-150 and HB-230, soybean oil-based polyols commercially available from MCPU Polymer Engineering; Terol 1154, commercially available from Oxid (Houston, Tex.); Multranol 3900, Multranol 3901, Arcol 11-34, Arcol 24-32, Arcol 31-28, Arcol E-351, Arcol LHT-42, and Arcol LHT-112, commercially available from Bayer; and Voranol 220-028, 220-094, 220-110N, 222-056, 232-027, 232-034, and 232-035, commercially available from Dow.

The one or more polyol can include 50% or less of one or more less reactive polyols in addition to the one or more highly reactive polyols. For example, the one or more polyol can include less than 45%, less than 40%, less than 35%, less than 30%, less than 25%, less than 20%, less than 15%, less than 10%, or less than 5%, of one or more less reactive polyols.

The one or more polyol for use in the disclosure can have an average functionality of 1.5 to 8.0, 1.6 to 6.0, 1.8 to 4.0, 2.5 to 3.5, or 2.6 to 3.1. The average hydroxyl number values (as measured in units of mg KOH/g) for the one or more polyol can be from about 100 to 600, 150 to 550, 200 to 500, 250 to 440, 300 to 415, and 340 to 400.

The polyurethane composites can include more than one type of polyol. The one or more polyols can be combined in various percentages, e.g., 15-40% of a less reactive polyol and 60-85% of a highly reactive polyol.

The polyurethane systems used to form the composite materials described herein can include one or more additional isocyanate-reactive monomers in addition to the one or more polyol. The one or more additional isocyanate-reactive monomers can include, for example, amine and optionally hydroxyl groups.

In some embodiments, the one or more additional isocyanate-reactive monomers can include a polyamine. The first isocyanate-reactive monomer can comprise a polyamine. Any suitable polyamine can be used. Suitable polyamines can correspond to the polyols described herein (for example, a polyester polyol or a polyether polyol), with the exception that the terminal hydroxy groups are converted to amino groups, for example by amination or by reacting the hydroxy groups with a diisocyanate and subsequently hydrolyzing the terminal isocyanate group to an amino group. By way of example, the polyamine can be polyether polyamine, such as polyoxyalkylene diamine or polyoxyalkylene triamine. Polyether polyamines are known in the art, and can be prepared by methods including those described in U.S. Pat. No. 3,236,895 to Lee and Winfrey. Exemplary polyoxyalkylene diamines are commercially available, for example, from Huntsman Corporation under the trade names Jeffamine® D-230, Jeffamine® D-400 and Jeffamine® D-2000. Exemplary polyoxyalkylene triamines are commercially available, for example, from Huntsman Corporation under the trade names Jeffamine® T-403, Jeffamine® T-3000, and Jeffamine® T-5000.

In some embodiments, the additional isocyanate-reactive monomer can include an alkanolamine. The alkanolamine can be a dialkanolamine, a trialkanolamine, a tetraalkanolamine, or a combination thereof. Suitable dialkanolamines include dialkanolamines which include two hydroxy-substituted $C_1$-$C_{12}$ alkyl groups (e.g., two hydroxy-substituted $C_1$-$C_8$ alkyl groups, or two hydroxy-substituted $C_1$-$C_6$ alkyl groups). The two hydroxy-substituted alkyl groups can be branched or linear, and can be of identical or different chemical composition. Examples of suitable dialkanolamines include diethanolamine, diisopropanolamine, ethanolisopropanolamine, ethanol-2-hydroxybutylamine, isopropanol-2-hydroxybutylamine, isopropanol-2-hydroxyhexylamine, ethanol-2-hydroxyhexylamine, and combinations thereof. Suitable trialkanolamines include trialkanolamines which include three hydroxy-substituted $C_1$-$C_{12}$ alkyl groups (e.g., three hydroxy-substituted $C_1$-$C_8$ alkyl groups, or three hydroxy-substituted $C_1$-$C_6$ alkyl groups). The three hydroxy-substituted alkyl groups can be branched or linear, and can be of identical or different chemical composition. Examples of suitable trialkanolamines include triisopropanolamine (TIPA), triethanolamine, N,N-bis(2-hydroxyethyl)-N-(2-hydroxypropyl)amine (DEIPA), N,N-bis(2-hydroxypropyl)-N-(hydroxyethyl)amine (EDIPA), tris(2-hydroxybutyl)amine, hydroxyethyl di(hydroxypropyl) amine, hydroxypropyl di(hydroxyethyl)amine, tri(hydroxypropyl)amine, hydroxyethyl di(hydroxy-n-butyl) amine, hydroxybutyl di(hydroxypropyl)amine, and combinations thereof.

In some embodiments, the additional isocyanate-reactive monomer can comprise an adduct of an alkanolamine described above with an alkylene oxide. The resulting amine-containing polyols can be referred to as alkylene oxide-capped alkanolamines. Alkylene oxide-capped alkanolamines can be formed by reacting a suitable alkanolamine with a desired number of moles of an alkylene oxide. Any suitable alkylene oxide or combination of alkylene oxides can be used to cap the alkanolamine. In some embodiments, the alkylene oxide is selected from the group consisting of ethylene oxide, propylene oxide, butylene oxide, and combinations thereof. Alkylene oxide-capped alkanolamines are known in the art, and include, for example, propylene oxide-capped triethanolamine sold under the trade names CARPOL® TEAP-265 and CARPOL® TEAP-335 (Carpenter Co., Richmond, Va.).

In some embodiments, the additional isocyanate-reactive monomer can include an alkoxylated polyamine (i.e., alkylene oxide-capped polyamines) derived from a polyamine and an alkylene oxide. Alkoxylated polyamine can be formed by reacting a suitable polyamine with a desired number of moles of an alkylene oxide. Suitable polyamines include monomeric, oligomeric, and polymeric polyamines. In some cases, the polyamines has a molecular weight of less than 1000 g/mol (e.g., less than 800 g/mol, less than 750 g/mol, less than 500 g/mol, less than 250 g/mol, or less than 200 less than 200 g/mol). Examples of suitable polyamines that can be used to form alkoxylated polyamines include ethylenediamine, 1,3-diaminopropane, putrescine, cadaverine, hexamethylenediamine, 1,2-diaminopropane, o-phenylenediamine, m-phenylenediamine, p-phenylenediamine, spermidine, spermine, norspermidine, toluene diamine, 1,2-propane-diamine, diethylenetriamine, triethylenetetramine, tetraethylene-pentamine (TEPA), pentaethylenehexamine (PEHA), and combinations thereof.

Any suitable alkylene oxide or combination of alkylene oxides can be used to cap the polyamine. In some embodiments, the alkylene oxide is selected from the group consisting of ethylene oxide, propylene oxide, butylene oxide, and combinations thereof. Alkylene oxide-capped polyamines are known in the art, and include, for example, propylene oxide-capped ethylene diamine sold under the trade name CARPOL® EDAP-770 (Carpenter Co., Richmond, Va.) and ethylene and propylene oxide-capped ethylene diamine sold under the trade name CARPOL® EDAP-800 (Carpenter Co., Richmond, Va.).

The additional isocyanate-reactive monomer (when used) can be present in varying amounts relative the one or more polyol used to form the polyurethane. In some embodiments, the additional isocyanate-reactive monomer can be present in an amount of 30% or less, 25% or less, 20% or less, 15% or less, 10% or less, or 5% or less by weight based on the weight of the one or more polyol.

As indicated herein, in the polyurethane composites, an isocyanate is reacted with a polyol (and any additional isocyanate-reactive monomers) to produce the polyurethane formulation. In general, the ratio of isocyanate groups to the total isocyanate reactive groups, such as hydroxyl groups, water and amine groups, is in the range of about 0.5:1 to about 1.5:1, which when multiplied by 100 produces an isocyanate index between 50 and 150. Additionally, the isocyanate index can be from about 80 to about 120, from about 90 to about 120, from about 100 to about 115, or from about 105 to about 110. As used herein, an isocyanate may be selected to provide a reduced isocyanate index, which can be reduced without compromising the chemical or mechanical properties of the composite material.

One or more catalysts can be added to facilitate curing and can be used to control the curing time of the polymer matrix. Examples of useful catalysts include amine-containing catalysts (such as DABCO, tetramethylbutanediamine, and diethanolamine) and tin-, mercury-, and bismuth-containing catalysts. In some embodiments, 0.01 wt % to 2 wt % catalyst or catalyst system (e.g., 0.025 wt % to 1 wt %, 0.05 wt % to 0.5 wt %, or 0.1 wt % to about 0.25 wt %) can be used based on the weight of the polyurethane composite.

The thermoset (e.g., polyurethane) can be present in the composite in amounts from 10% to 60% based on the weight of polyurethane composite. For example, the thermoset can be included in an amount from 14% to 60% or 20% to 50% by weight, based on the weight of the thermoset composite. In some embodiments, the thermoset in the thermoset composites can be present in an amount of 10% or greater, 15% or greater, 20% or greater, 25% or greater, 30% or greater, 35% or greater, 40% or greater, 45% or greater, 50% or greater, or 55% or greater by weight, based on the weight of thermoset composite. In some embodiments, the thermoset in the thermoset composites can be present in an amount of 60% or less, 55% or less, 50% or less, 45% or less, 40% or less, 35% or less, 30% or less, 25% or less, 20% or less, or 15% or less by weight, based on the weight of thermoset composite.

The thermoset composites can include an inorganic filler. Suitable examples of inorganic fillers can be an ash, ground/recycled glass (e.g., window or bottle glass); milled glass; glass spheres; glass flakes; activated carbon; calcium carbonate; aluminum trihydrate (ATH); silica; sand; ground sand; silica fume; slate dust; crusher fines; red mud; amorphous carbon (e.g., carbon black); clays (e.g., kaolin); mica; talc; wollastonite; alumina; feldspar; bentonite; quartz; garnet; saponite; beidellite; granite; calcium oxide; calcium hydroxide; antimony trioxide; barium sulfate; magnesium oxide; titanium dioxide; zinc carbonate; zinc oxide; nepheline syenite; perlite; diatomite; pyrophillite; flue gas desulfurization (FGD) material; soda ash; trona; and mixtures thereof. In some embodiments, the inorganic filler includes an ash. The ash can be a coal ash or another type of ash such as those produced by firing fuels including industrial gases, petroleum coke, petroleum products, municipal solid waste, paper sludge, wood, sawdust, refuse derived fuels, switchgrass or other biomass material. The coal ash can be fly ash, bottom ash, or combinations thereof. In some examples, the inorganic filler includes fly ash. Fly ash is produced from the combustion of pulverized coal in electrical power generating plants. The fly ash useful with the composite materials described herein can be Class C fly ash, Class F fly ash, or a mixture thereof. Fly ash produced by coal-fueled power plants is suitable for incorporation in the composites described herein. In some embodiments, the inorganic filler consists of or consists essentially of fly ash.

The inorganic filler can be present in the thermoset composites described herein in amounts from 20% to 90% by weight. In some embodiments, the inorganic filler, for example fly ash, calcium carbonate, or mixtures thereof, can be present in amounts from 35% to 80% such as from 50% to 80%, from 50% to 75% by weight, or from 50% to 70% by weight. Examples of the amount of inorganic filler present in the composites described herein include 20%, 25%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, or 90% by weight. In some embodiments, the inorganic filler includes fly ash in the above-referenced amounts. In some embodiments, the inorganic filler includes calcium carbonate in the above-referenced amounts. In some embodiments, the calcium carbonate can be limestone.

In some embodiments, the inorganic filler can include sand. In certain embodiments, the inorganic filler can include fly ash and sand. The amount of sand in the composites can be from 0.1% to 15% by weight, based on the weight of the composite. In some embodiments, the composites can include 15% or less, 14% or less, 12% or less, 10% or less, or 8% or less by weight sand. In some embodiments, the composites can include 0.1% or greater, 0.5% or greater, 1% or greater, 2% or greater, 3% or greater, or 5% or greater by weight sand. In some embodiments, the composites can include 1% to 15%, 1% to 10%, or 1% to 8% by weight sand. In some embodiments, the sand is blast sand. In some embodiments, the inorganic filler can include fly ash and calcium carbonate. In certain embodiments, the inorganic filler can include fly ash, sand, and calcium carbonate. In the blends with fly ash and optionally sand, the amount of calcium carbonate in the composites can be from 0.1% to 15% by weight, based on the weight of the composite. In some embodiments, in the blends with fly ash and optionally sand, the composites can include 15% or less, 14% or less, 12% or less, 10% or less, or 8% or less by weight calcium carbonate. In some embodiments, the composites can include 0.1% or greater, 0.5% or greater, 1% or greater, 2% or greater, 3% or greater, or 5% or greater by weight calcium carbonate. In some embodiments, in the blends with fly ash and optionally sand, the composites can include 1% to 15%, 1% to 10%, or 1% to 8% by weight calcium carbonate.

The thermoset composites can include an organic fiber. The organic fiber can be any natural or synthetic fiber, based on organic materials. The organic fiber may improve the processability and mechanical strength of the composites. The organic fiber can be present in the form of individual fibers, bundles, strings such as yarns, fabrics, papers, rovings, mats, or tows.

Suitable examples of organic fibers that can be used in the composite can include polyalkylene fibers, polyester fibers, polyamide fibers, phenol-formaldehyde fibers, polyvinyl chloride fibers, polyacrylic fibers, acrylic polyester fibers, polyurethane fibers, polyacrylonitrile fibers, rayon fibers, cellulose fibers, or combinations thereof. In certain embodiments, the organic fiber can include hemp fibers, sisal fibers, cotton fibers, straw, reeds, or other grasses, jute, bagasse fibers, bamboo fibers, abaca fibers, flax, southern pine fibers, wood fibers, cellulose, saw dust, wood shavings, lint, vicose, leather fibers, rayon, and mixtures thereof. Other suitable organic fiber includes synthetic fibers such as, Kevlar, viscose fibers, Dralon® fibers, polyethylene fibers, polyethylene terephthalate fibers, polyethylene naphthalate fibers, polypropylene fibers, polyvinyl alcohol fibers, aramid fibers, or combinations thereof. In some examples, the organic fiber can include polyester fibers. In some examples, the organic fiber can be obtained from a waste material such as from used carpets or other consumer sources.

The organic fiber in the composites can have an average length of 50 mm or less. For example, the organic fiber can have an average length of 50 µm or greater, 60 µm or greater, 70 µm or greater, 80 µm or greater, 90 µm or greater, 100 µm or greater, 110 µm or greater, 120 µm or greater, 200 µm or greater, 300 µm or greater, 500 µm or greater, 750 µm or greater, 1 mm or greater, 2 mm or greater, 3 mm or greater, 5 mm or greater, 7.5 mm or greater, 10 mm or greater, 15 mm or greater, 20 mm or greater, 25 mm or greater, 30 mm or greater, 35 mm or greater, 40 mm or greater, or 45 mm or greater. In some embodiments, the organic fiber can have an average length of 45 mm or less, 40 mm or less, 35 mm or less, 30 mm or less, 26 mm or less, 20 mm or less, 15 mm or less, 10 mm or less, 7.5 mm or less, 6 min or less, 5 mm or less, 3 mm or less, 2 mm or less, 1.5 mm or less, 1 mm or less, 900 µm or less, 800 µm or less, 700 µm or less, 600 µm or less, 500 µm or less, 400 µm or less, 300 µm or less, 250 μm or less, 200 μm or less, 150 μm or less, 140 μm or less, 130 μm or less, 120 μm or less, 110 μm or less, 100 μm or less, 90 μm or less, 80 μm or less, 70 μm or less, 60 μm or less, or 50 μm or less. In certain embodiments, the organic fiber in the composites can have an average length of from 50 μm to 50 mm, 50 μm to 26 mm, 50 μm to 15 mm, 100 μm to 10 mm, 500 μm to 7.5 mm, 1 mm to 7 mm, or 3 mm to 6 mm. In some examples, the organic fiber can have an average length of 26 mm or less. In some examples, the organic fiber can have an average length of 100 μm or greater. In some embodiments, the lengths of the organic fiber in the composite can be uniform (i.e., the lengths of all the fibers can be within 10% of the average length). In some embodiments, the lengths of the organic fiber in the composite can vary. For example, the fiber lengths can fall into two modes having an average length within the disclosed range.

The organic fiber in the composites can have an average diameter of 100 microns or less. In some embodiments, the organic fiber can have an average diameter of 95 microns or less, 90 microns or less, 85 microns or less, 80 microns or less, 75 microns or less, 70 microns or less, 65 microns or less, 50 microns or less, 45 microns or less, 40 microns or less, 30 microns or less, or 25 microns or less. In some embodiments, the organic fiber can have an average diameter of 1 micron or more, 2 microns or more, 3 microns or more, 5 microns or more, 10 microns or more, 15 microns or more, 20 microns or more, 25 microns or more, 30 microns or more, 35 microns or more, 40 microns or more, or 45 microns or more. In some embodiments, the organic fiber can have an average diameter of from 1 micron to 100 microns, 3 microns to 100 microns, 3 microns to 90 microns, 3 microns to 85 microns, 3 microns to 80 microns, 3 microns to 75 microns, 3 microns to 50 microns, 5 microns to 100 microns, or 10 microns to 100 microns.

The organic fiber can also be described by its aspect ratio. In some embodiments, the organic fiber in the composites can have an average aspect ratio of length to diameter of from 1.5:1 to 4000:1. For example, the organic fiber can have an average aspect ratio of from 1.5:1 to 2000:1, 1.5:1 to 1000:1, 1.5:1 to 750:1, 1.5:1 to 500:1, 1.5:1 to 400:1, 1.5:1 to 300:1, 1.5:1 to 250:1, 2:1 to 200:1, 2.5:1 to 150:1, 3:1 to 100:1, 3.5:1 to 75:1, 4:1 to 50:1, 5:1 to 25:1, 5:1 to 20:1, or 5:1 to 10:1. In some embodiments, the organic fiber can have an average aspect ratio of length to diameter of from 1.5:1 or greater, 2:1 or greater, 3:1 or greater, 4:1 or greater, 5:1 or greater, 7.5:1 or greater, 10:1 or greater, 15:1 or greater, 20:1 or greater, 25:1 or greater, 30:1 or greater, or 40:1 or greater. In some embodiments, the organic fiber can have an average aspect ratio of length to diameter of from 200:1 or less, 150:1 or less, 100:1 or less, 75:1 or less, 50:1 or less, 40:1 or less. 30:1 or less, 20:1 or less, 10:1 or less, or 5:1 or less.

The organic fiber can be present in the composites in any suitable amount to confer a desirable property to the composite. In some embodiments, the organic fiber can be present in the composites in amounts of 0.1% or greater, 0.5% or greater, 1% or greater, 1.25% or greater, 1.5% or greater, 2% or greater, 3% or greater, 4% or greater, or 5% or greater by weight, based on the total weight of the composite. In some embodiments, the organic fiber can be present in the composites in amounts of 20% or less, 15% or less, 10% or less, 8% or less, 7.5% or less, 7% or less, 6% or less, or 5% or less by weight, based on the total weight of the composite. In some embodiments, the organic fiber can be present in the polymeric composites in amounts from 0.1% to 25% by weight, based on the total weight of the composite. For example, the organic fiber can be in amounts from 0.1% to 20%, 0.5% to 15%, 0.5% to 10%, 0.5% to 8%, or 0.25% to 4% by weight, based on the total weight of the composite. In some embodiments, the organic fiber is present in the composites in an effective amount to increase the flexural strength and/or handleability of a composite having a density of 45 lb/ft$^3$ or less, compared to a composite without the organic fiber.

The composites can include an inorganic fiber. The inorganic fiber can be any natural or synthetic fiber, based on inorganic materials. Inorganic fibers suitable for use with the composites can include glass fibers, basalt fibers, alumina silica fibers, aluminum oxide fibers, silica fibers, carbon fibers, metal fibers, mineral wool fibers such as stone wool, slag wool, or ceramic fiber wool, or combinations thereof. In some embodiments, the composites can include a combination of inorganic fibers that break and fibers that do not break when the composite is being formed using processing machinery and/or fractured by external stress.

In some embodiments, the inorganic fiber in the composites can include a plurality of glass fibers. Glass fibers can include fibrous glass such as E-glass, C-glass, S-glass, and AR-glass fibers. In some examples, fire resistant or retardant glass fibers can be included to impart fire resistance or retarding properties to the composites. In some embodiments, the average length of the glass fibers in the composites can be 1 mm or greater, 1.5 mm or greater, 2 mm or greater, 3 mm or greater, 4 mm or greater, 5 mm or greater, or 6 mm or greater. In some embodiments, the average length of the glass fibers can be 50 mm or less, 40 mm or less, 30 mm or less, 20 mm or less, 15 mm or less, 12 mm or less, or 10 mm or less. In some examples, the glass fibers can be from 1 mm to 50 mm in average length. For example, the glass fibers can be from 1.5 mm to 30 mm, from 2 mm to 30 mm, from 3 mm to 30 mm, or from 3 mm to 15 mm in average length. The glass fibers in the composites can have any dimension of from 1 μm to 30 μm in average diameter. For example, the average diameter of the glass fibers can be 1.5 μm to 30 μm, 3 μm to 20 μm, 4 μm to 18 μm, or 5 μm to 15 μm in average diameter. The glass fibers can be provided in provided in the composite in a random orientation or can be axially oriented.

The inorganic fiber (when used) can be present in the composites in amounts from 0.25% to 20% by weight, based on the weight of composite. For example, the inorganic fiber can be present in amounts from 0.5% to 20%, 0.5% to 15%, 1% to 20%, 2% to 20%, 0.5% to 10%, 1% to 10%, 2% to 10%, 1.5% to 8%, 2% to 6%, or 2% to 4% by weight, based on the weight of the composite.

The weight ratio of the inorganic fiber to the organic fiber can be 1:1 or greater. In some embodiments, the weight ratio of the inorganic fiber to the organic fiber can be 1:1 or greater, 2:1 or greater, 3:1 or greater, 4:1 or greater, 5:1 or greater, 6:1 or greater, 7:1 or greater, 8:1 or greater, 9:1 or greater, 10:1 or greater, or 15:1 or greater. In some embodiments, the weight ratio of the inorganic fiber to the organic fiber can be 20:1 or less, 18:1 or less, 15:1 or less, 12:1 or less, 10:1 or less, 9:1 or less, 8:1 or less, 7:1 or less, 6:1 or less, or 5:1 or less. For example, the weight ratio of the inorganic fiber to the organic fiber can be from 1:1 to 20:1, 1:1 to 15:1, 1:1 to 10:1, 1:1 to 9:1, 1:1 to 8:1, 1:1 to 7:1, 1.5:1 to 6:1, or 2:1 to 5:1.

In some embodiments, the organic fiber, inorganic fiber, and/or inorganic filler such as fly ash can be coated with a composition to modify their reactivity. For example, the organic fiber, inorganic fiber, and/or inorganic filler can be coated with a sizing agent such as a coupling agent (compatibilizer). In some embodiments, the organic fiber, inorganic fiber, and/or the fly ash can be coated with a composition for promoting adhesion. U.S. Pat. No. 5,064,876 to Hamada et al. and U.S. Pat. No. 5,082,738 to Swofford, for example, disclose compositions for promoting adhesion. U.S. Pat. No. 4,062,999 to Kondo et al. and U.S. Pat. No. 6,602,379 to Li et al. describe suitable aminosilane compounds for coating fibers. In some embodiments, the organic fiber, inorganic fiber, and/or inorganic filler are surface coated with a composition comprising a silane compound such as aminosilane. In some embodiments, the organic fiber, inorganic fiber, and/or inorganic filler are surface coated with a composition comprising an oil, starch, or a combination thereof. In some embodiments, the composites can include a combination of coated and uncoated fibers and/or inorganic filler.

The composites described herein can comprise additional materials. The additional materials can include an organic filler, such as a recycled polymeric material. Suitable examples include pulverized polymeric foam or recycled rubber material. Additional components useful with the composites can include foaming agents, blowing agents, surfactants, chain-extenders, crosslinkers, coupling agents, UV stabilizers, fire retardants, antimicrobials, anti-oxidants, and pigments. For example, the organic fiber, inorganic fiber, and/or inorganic filler can be coated with a surfactant, bonding agent, pigment, or combinations thereof. Though the use of such components is well known to those of skill in the art, some of these additional additives are further described herein.

Chemical foaming agents include azodicarbonamides (e.g., Celogen manufactured by Lion Copolymer Geismar); and other materials that react at the reaction temperature to form gases such as carbon dioxide. In the case of polyurethane and polyisocyanurate foam, water is an exemplary foaming agent that reacts with isocyanate to yield carbon dioxide. The presence of water as an added component or in the filler also can result in the formation of polyurea bonds through the reaction of the water and isocyanate. In some embodiments, water may be present in the mixture used to produce the polyurethane composite in an amount of from greater than 0% to 5% by weight or less, based on the weight of the mixture. In some embodiments, water can be present in a range of 0.02% to 4%, 0.05% to 3%, 0.1% to 2%, or 0.2% to 1% by weight, based on the weight of the mixture. In some embodiments, the mixture used to produce the composite includes less than 0.5% by weight water.

Surfactants can be used as wetting agents and to assist in mixing and dispersing the materials in a composite. Surfactants can also stabilize and control the size of bubbles formed during the foaming event and the resultant cell structure. Surfactants can be used, for example, in amounts below about 0.5 wt % based on the total weight of the mixture. Examples of surfactants useful with the thermosets described herein include anionic, non-ionic and cationic surfactants. For example, silicone surfactants such as Tegostab B-8870, DC-197 and DC-193 (Air Products; Allentown, Pa.) can be used.

Low molecular weight reactants such as chain-extenders and/or crosslinkers can be included in the composite described herein. These reactants help, for example, in the polyurethane system to distribute and contain the organic fiber, inorganic fiber, and/or inorganic filler within the composite. Chain-extenders are difunctional molecules, such as diols or diamines, that can polymerize to lengthen the urethane polymer chains. Examples of chain-extenders include ethylene glycol; 1,4-butanediol; ethylene diamine; 4,4'-methylenebis(2-chloroaniline) (MBOCA); diethyltoluene diamine (DETDA); and aromatic diamines such as Unilink 4200 (commercially available from UOP). Crosslinkers are tri- or greater functional molecules that can integrate into a polymer chain through two functionalities and provide one or more further functionalities (i.e., linkage sites) to crosslink to additional polymer chains. Examples of crosslinkers include glycerin, trimethylolpropane, sorbitol, diethanolamine, and triethanolamine. In some composites, a crosslinker or chain-extender may be used to replace at least a portion of the one or more polyol in the composite material. For example, the polyurethane can be formed by the reaction of an isocyanate, a polyol, and a crosslinker.

Coupling agents and other surface treatments such as viscosity reducers, flow control agents, or dispersing agents can be added directly to the filler or fiber, or incorporated prior to, during, and/or after the mixing and reaction of the composite material. Coupling agents can allow higher filler loadings of the inorganic filler such as fly ash, organic fiber, and/or inorganic fiber, and may be used in small quantities. For example, the composite material may comprise about 0.01 wt % to about 0.5 wt % of a coupling agent. Examples of coupling agents useful with the composite materials described herein include Ken-React LICA 38 and KEN-React KR 55 (Kenrich Petrochemicals; Bayonne, N.J.). Examples of dispersing agents useful with the composite materials described herein include JEFFSPERSE X3202, JEFFSPERSE X3202RF, and JEFFSPERSE X3204 (Huntsman Polyurethanes; Geismar, La.).

Ultraviolet light stabilizers, such as UV absorbers, can be added to the composite materials described herein. Examples of UV light stabilizers include hindered amine type stabilizers and opaque pigments like carbon black powder. Fire retardants can be included to increase the flame or fire resistance of the composite material. Antimicrobials can be used to limit the growth of mildew and other organisms on the surface of the composite. Antioxidants, such as phenolic antioxidants, can also be added. Antioxidants provide increased UV protection, as well as thermal oxidation protection.

Pigments or dyes can optionally be added to the composite materials described herein. An example of a pigment is iron oxide, which can be added in amounts ranging from about 2 wt % to about 7 wt %, based on the total weight of the composite material.

Methods of preparing the polyurethane composites are described herein. The polyurethane composites can be formed by the reaction of one or more isocyanate, selected from the group consisting of diisocyanates, polyisocyanates, and mixtures thereof, and one or more polyol, in the presence of an organic fiber and an inorganic filler. An inorganic fiber and/or a catalyst can also be present in the reaction mixture. In some embodiments, the polyurethane composite can be produced by mixing the one or more isocyanates, the one or more polyols, the organic fiber, and the inorganic filler, in a mixing apparatus such as a high speed mixer or an extruder. In some embodiments, mixing can be conducted in an extruder. The materials can be added in any suitable order. For example, in some embodiments, the mixing stage of the method used to prepare the polyurethane composite can include: (1) mixing the polyol, the organic fiber, and inorganic filler; (2) mixing the isocyanate with the polyol, the organic fiber, and inorganic filler; and optionally (3) mixing the catalyst with the isocyanate, the polyol, the organic fiber, and the inorganic filler. The inorganic fiber can be added at the same time as the organic fiber and inorganic filler, or can be added prior to, during, or after stage (2) or (3).

The polyurethane composite mixture can be blended in any suitable manner to obtain a homogeneous or heterogeneous blend of the one or more isocyanate, one or more polyol, inorganic filler, organic fiber, inorganic fiber, and catalyst. An ultrasonic device can be used for enhanced mixing and/or wetting of the various components of the composite. The ultrasonic device produces an ultrasound of a certain frequency that can be varied during the mixing and/or extrusion process. The ultrasonic device useful in the preparation of composite materials described herein can be attached to or adjacent to an extruder and/or mixer. For example, the ultrasonic device can be attached to a die or nozzle or to the port of an extruder or mixer. An ultrasonic device may provide de-aeration of undesired gas bubbles and better mixing for the other components, such as blowing agents, surfactants, and catalysts.

Incorporation of the organic fiber into the filled polyurethane mixture comprising an inorganic fiber (that is, the polyol, isocyanate, organic fiber, inorganic fiber, and inorganic filler) can decrease the viscosity of the mixture, and thus improve the processability of such materials and products. In some embodiments, it is desirable that the composite mixture has a viscosity below a particular threshold at the desired loadings so it can be effectively processed. In some embodiments, the organic fiber can be present in the composite mixture in amounts to produce a workable viscosity (initial viscosity) of from 25 Pa·s to 250 Pa·s. For example, the organic fiber in the composite mixture can be in amounts to produce a workable viscosity from 30 Pa·s to 250 Pa·s, 65 Pa·s to 250 Pa·s, or 80 Pa·s to 250 Pa·s. In some embodiments, the working viscosity can be more than 25 Pa·s, more than 30 Pa·s, more than 35 Pa·s, more than 40 Pa·s, more than 50 Pa·s, more than 60 Pa·s, more than 65 Pa·s, more than 70 Pa·s, or more than 80 Pa·s. In some embodiments, the working viscosity can be less than 250 Pa·s, less than 225 Pa·s, less than 200 Pa·s, less than 175 Pa·s, less than 150 Pa·s, less than 140 Pa·s, less than 130 Pa·s, less than 120 Pa·s, or less than 110 Pa·s. The mixture may be processed at an elevated temperature (e.g., 200-500° F.) to form a melt and to allow the mixture to have a workable viscosity. In some embodiments, the organic fiber, inorganic fiber, and/or inorganic filler are heated before mixing with the polyurethane. The viscosity of the composite mixture can be measured using a Thermo Electron Corporation Haake Viscometer.

In some embodiments, incorporation of the organic fiber into the filled polyurethane composites comprising an inorganic fiber or partial replacement of the inorganic fiber with an organic fiber can maintain similar or improved physical properties and mechanical performance such as flexural strength and handleability of such materials. Further, partial or full replacement of inorganic fibers by organic fibers can make the fiber system less susceptible to breaking and crushing during the production process of highly-filled polyurethane composites and thus increases the efficiency of fiber reinforcement.

In some embodiments, incorporation of the organic fiber in a polyurethane composite can increase the flexural strength of the composite, compared to a composite without the organic fiber. In some embodiments, the flexural strength of the polyurethane composites can be increased by at least 10%, for example, 15% or greater, 20% or greater, 25% or greater, 30% or greater, 35% or greater, 50% or greater, 75% or greater, or even 100% or greater, compared to a composite without organic fiber. The flexural strength of the polyurethane composites described herein can be 200 psi or greater (e.g., up to 1600 psi). For example, the flexural strength of the polyurethane composites can be 300 psi or greater, 500 psi or greater, 700 psi or greater, 900 psi or greater, 1000 psi or greater, 1100 psi or greater, 1200 psi or greater, 1300 psi or greater, 1400 psi or greater, 1500 psi or greater, or 1600 psi or greater. The flexural strength can be determined by the load required to fracture a rectangular prism loaded in the three point bend test as described in ASTM C1185-08 (2012).

The composite mixture can be extruded into a mold cavity of a mold, the mold cavity formed by at least an interior mold surface. The mold can be a continuous forming system such as a belt molding system or can include individual batch molds. The belt molding system can include a mold cavity formed at least in part by opposing surfaces of two opposed belts. A molded article can then be formed followed by removal of the article from the mold.

Textured Surfaces

In some embodiments, the composite can include at least one textured surface. The textured surface includes a plurality of particles protruding from the surface to impart a texture. The textured surface can include a coating layer having a thickness $T_b$. In some embodiments $T_b$ is not more than about 5, 4, 3, 2, 1 or 0.5 mm thick. In some embodiments, the textured surface can include a binder. Suitable binders include non-water soluble binders such as thermoset resins. Exemplary resins include polyurethanes, polyisocyanurates, epoxies, vinyl esters, ethylene-vinyl acetate (EVA) copolymers, polyesters, polyimides, polyoxybenzylmethylenglycolanhydrides (e.g., Bakelite), phenolics (e.g., Duroplast), acrylics, and mixtures thereof. In certain embodiments, the binder can include UV-curable or microwave-curable resins.

In some embodiments, the resin is obtained from a sheet molding compound (SMC). The sheet molding compound can include a thermosetting resin (such as those described herein), and optionally various additional components such as thermoplastic resins, catalysts, filler, and fibers, including chopped glass fibers. In some embodiments, the sheet molding compound can be available as a blend of resin and chopped fibers sandwiched between films of plastic material to form a laminated sheet that is wound in rolled form or festooned for storage.

The textured surface can include particles having an average particle size PS. In some embodiments, PS is no less than about 1 μm, 2 μm, 3 μm, 4 μm, 5 μm, 6 μm, 7 μm, 8 μm, 9 μm, or 10 μm. In some embodiments, PS is no greater than about 10 μm, 5 μm, 4 μm, 3 μm, 2 μm, 1 μm, or 0.5 μm. Such particles sizes can be used for surfaces mimicking stucco, cement and marble. In some embodiments, PS is no less than about 0.5 mm, 1 mm, 2 mm, 3 mm, 4 mm, 5 mm, 6 mm, 7 mm, 8 mm, 9 mm, or 10 mm. In some embodiments, PS is no greater than about 10 mm, 9 mm, 8 mm, 7 mm, 6 mm, 5 mm, 4 mm, 3 mm, 2 mm, 1 mm, or 0.5 mm. Such particle sizes can be used for surfaces mimicking stone and brick. Suitable particle types include those made from cement, stucco, clay, mica, pulverized brick, sand, limestone, calcium carbonate, quartz, fly ash, or mixtures thereof. The sand can be pigmented sand. Exemplary sands include quartz sand, which can have an average particle size from 0.1-10 mm, 0.1-5 mm, 1-5 mm, or 1.5-3 mm. In certain embodiments, the particle is a reactive particle such as cement or stucco, which undergoes further transformation as it is hydrated. Mixtures of different particles having different average particle sizes can also be employed.

The textured surface is characterized by particles that protrude from the surface to provide a texture. In other words, the particles are not completely encapsulated within the core or coating layer. Instead, no more than 90%, no more than 85%, no more than 80%, no more than 75%, no more than 70%, no more than 65%, no more than 60%, no more than 55%, no more than 50%, no more than 45%, no more than 40%, no more than 35%, no more than 30%, no more than 25%, no more than 20%, no more than 15%, or no more than 10% of the particle surfaces are coated by the core or coating layer. Particles that are not completely encapsulated by the binder contribute to the textured feel of the surface.

In certain embodiments, the ratio of the coating layer thickness to particle size in the textured composite can be characterized by the formula $T_b=n*PS$, wherein $T_b$ is the coating layer thickness of the textured composite, PS is the particle size of the particles used in the textured composite, $T_b$ and PS are expressed in a common unit (e.g., mm), and n is a number from 0.1-0.95, a number from 0.2-0.8, a number from 0.25-0.75, a number from 0.3-0.75, a number from 0.4-0.75, a number from 0.5-0.75, a number from 0.5-0.8, a number from 0.5-0.9, a number from 0.5-0.95, a number from 0.1-0.5, a number from 0.1-0.4, a number from 0.1-0.3, or a number from 0.1-0.25.

Provided herein are methods of making composites with textured surfaces. In certain embodiments, one of the plastic film layers covering a roll of sheet molding compound can be removed, and the sheet molding compound can be coupled with the substrate. By way of example, the sheet molding compound can be affixed using a cold-press process. Subsequently, the second plastic film layer can be removed, and the exposed surface of the sheet molding compound can be coated, dusted, sprayed or otherwise combined with a plurality of particles. In other embodiments, other binders may be applied to a substrate using methods known in the art, followed by coating, dusting, spraying or otherwise combined with a plurality of particles. In some embodiments, the sheet molding compound can be combined with the particles, rolled and sealed in plastic for application to a substrate at a later time.

In certain embodiments, a composite having at least one textured surface can obtained by foaming a thermoset material in the presence of a plurality of particles. Generally, a first plurality of particles can be introduced into a mold. In some embodiments, the particles can be applied to the mold as a powder, while in other embodiments, the particles are applied in a liquid carrier, such as an alcohol, for instance a polyol. Other liquid carriers include hydrocarbons such as alkanes. When the particles are applied to the mold using a liquid carrier, they may be applied by a process such as belt wetting, spraying, calendaring, slurry coating, curtain coating, brushing and the like. After the particles are added, a foamable composition can be added to the mold. A substrate can then be obtained by allowing the foamable composition to expand to fill the mold. As the composition expands, the particles are embedded in the surface of the substrate. Once the composition has foamed, the textured composite can be removed from the mold. The process described above can be economized by eliminating the need to introduce a new plurality of particles for each substrate. Generally, an excess of particles can be introduced to the mold, followed by a foamable composition selected such that as it foams, only a portion of the particles are embedded into the foamed substrate. After the textured composite is removed, another foamable composition can be added to the mold and allowed to entrap some of the remaining particles.

In certain embodiments, a binder can be introduced to the mold before the foamable composition is added. For example, the binder can be introduced as a preformed sheet such as a sheet molding compound or as a liquid composition. The binder can be added at the same time, before, or after the particles. The binder may be added as a separate composition from the particles, or the binder may be admixed with the particles and the mixture added to the mold. Exemplary binders include thermosetting resins such as those described herein, for instance, polyurethanes, polyisocyanurates, epoxies, vinyl esters, ethylene-vinyl acetate (EVA) copolymers, polyesters, polyimides, polyoxybenzylmethylenglycolanhydrides (e.g., Bakelite), phenolics (e.g., Duroplast), acrylics, and mixtures thereof. In some embodiments the resin can include a UV-curable or microwave curable resin. In some embodiments, the particles can be applied to the binder such as a SMC using a roller process, and the binder/particle sheet then added to the mold. In other embodiments, the particles and binder can be mixed together to give a paste or dough, which can then be applied to the mold.

In comparison to conventional processes in which a binder is pressed with an already foamed substrate, adding a foamable composition such as a polyurethane and foaming the composition in the presence of a binder such as the resin described herein can form chemical bonds between the foam substrate and binder. In particular, unreacted functional groups present in the foam and binder (e.g., isocyanates, epoxides, alcohols, amines, carboxylic acids, and the like) can react with each other at the surface interface of the binder and foam, chemically joining the binder with the substrate. In contrast, conventional processes having an already foamed substrate will only produce mechanical bonds between the foam substrate and binder.

In some embodiments, a veil of glass fibers (a glass veil) can be added to the mold after the particles have been added.

A substrate having multiple textured surfaces can be obtained by applying a second plurality of particles to the foamable composition before it expands to fill the mold. In some embodiments, a glass veil can be added before adding the second plurality of particles. The second plurality of particles can be the same, or different than the first plurality of particles. In some embodiments, a second binder can be added to the mold after the foamable composition. If a second plurality of particles are also being added, the binder may be added at the same time or sequentially before or after the particles. The binder may be added as a separate composition from the particles, or the binder may be admixed with the particles and the mixture added to the mold.

In certain embodiments, a reactive cementitious slurry can be added to the foamable composition in the mold. The slurry can further contain sand and/or other fillers to provide texture and tactility to the surface. Rapid setting materials such as CAC, CASC, inorganic polymers and/or magnesium phosphates are preferred.

The above described processes may be carried out with a variety of molds, including box molds and continuous molds. In some embodiments, the continuous mold is formed by two opposing endless belts.

In certain embodiments, the textured surfaces prepared as described above can be further painted, colored or decorated. Exemplary techniques for imparting images include spray painting, curtain coating, brushing, roller coating, print screening and ink jet printing.

Printed Images

An image can be imparted onto the textured surface using an ink jet printing mechanism. Inks generally useful for printing onto ceramic surfaces can be advantageously used to impart an image onto a textured surface. Two kind of inks for inkjet printing of ceramics are known: inks constituted by solutions of metallic cations and inks based on dispersions of inorganic pigments. Inorganic pigments used for traditional decoration in ceramic, such as screen printing and photogravure, have average particle size above 1 µm. In some embodiments, it is preferred that the inorganic pigments are well dispersed in the liquid medium and are less than about 1 µm in diameter, in order to allow the ink to pass through small nozzles at high speed. In some embodiments, it is preferred that the ink is dispensed through the nozzle at sufficient speed to penetrate the surface of the binder. Exemplary inks based on dispersions of inorganic pigments in polar organic mediums are described in EP 2159269, WO 2006/126189, and EP 1840178.

The ink jet dispenser can be positioned above the textured surface, and the ink can be applied with sufficient pressure to not only coat the surface, but also penetrate into the binder. Because the ink jet dispenser does not actually contact the textured surface, there is no risk the dispenser will stick to the binder or disrupt the soft mastic. Because the ink jet dispenser can be precisely controlled, intricate images with sharp contrasting colors such as grout and brick can be accurately and rapidly printed onto a textured surface, without the need for stencils. In other embodiments, randomized images can be printed onto the surface to reproduce natural materials like stone and marble.

In certain embodiments, patterns can be formed in the textured surface prior to printing the image. The patterns can be formed from the mold itself, or by using machine shaving, machine cutting, and/or CNC (computer numerical control) machining processes. By way of example, grout lines can be formed in the textured surface to mimic brick building materials.

In certain embodiments, the composite can be cured using heat and/or pressure after the image is printed onto the textured surface, while in other embodiments, the composite can be cured using heat and/or pressure prior to printing the image. In certain embodiments, the curing is performed such that the inorganic pigment(s) bond with the binder. In contrast to images printed with other types of dyes, the disclosed composites provide a hard surface feel with scratch resistance.

The printed images can have enhanced color stability. For instance, the color difference of the image, as measured using (ΔE*ab) can be no greater than ±10, ±9, ±8, ±7, ±6, ±5, ±4, ±3, ±2 or ±1 as determined after 2000 hours or after 4000 hours using a QUV accelerated weathering test. Suitable test protocols for measuring color stability are available, depending on the specific nature of the material, including ASTM G154, ASTM D4329, ASTM D4587, ASTM D5208, ASTM D6577, ISO 29664, ISO 4892-1, ISO 4892-3, and ISO 11507. Binding the pigments with the particles confers enhanced stability to the image, making it unnecessary to further cover the image within a protective film, such as a thermoplastic material.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative materials and method steps disclosed herein are specifically described, other combinations of the materials and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments and are also disclosed. As used in this disclosure and in the appended claims, the singular forms "a", "an", "the", include plural referents unless the context clearly dictates otherwise.

What is claimed is:
1. A building material comprising:
a composite comprising:
(a) a polymeric substrate comprising a foam formed from a composition comprising:
at least one polyol;
at least one isocyanate reactive with the at least one polyol; and
an inorganic filler; and
(b) a textured surface in contact with the polymeric substrate, the textured surface comprising:
a binder; and
a plurality of particles having an average particle size of less than or equal to about 10 µm;
wherein the binder comprises functional groups chemically bonded to the polymeric substrate;
wherein the plurality of particles has a chemical composition different from a chemical composition of the inorganic filler of the foam; and
wherein at least a portion of the plurality of particles is embedded in the foam, and at least a portion of the plurality of particles protrudes from the textured surface.

2. The building material according to claim 1, wherein the plurality of particles is selected from the group consisting of cement, stucco, clay, pulverized brick, mica, sand, limestone, calcium carbonate, quartz, fly ash, and combinations thereof.

3. The building material according to claim 1, wherein the binder is a thermosetting resin selected from the group consisting of an epoxy, a polyurethane, a polyisocyanurate, a polyoxybenzylmethylenglycolanhydride, a polyimide, an ethylene-vinyl acetate (EVA) copolymer, a vinyl ester, a phenolic, an acrylic, a polyester, and combinations thereof.

4. The building material of claim 1, wherein the binder is a sheet molding compound.

5. The building material according to claim 1, further comprising an image printed upon the textured surface, wherein the image comprises an ink having at least one inorganic pigment.

6. The building material according to claim 5, wherein at least a portion of the inorganic pigment is disposed in the binder.

7. The building material according to claim 1, wherein the foam further comprises an organic fiber component present in the foam in an amount of from about 0.1 parts by weight to about 25 parts by weight based on 100 parts by weight of the foam;

wherein the organic fiber component includes a plurality of organic fibers having:
an average length of from about 50 µm to about 50 mm;
an average diameter of from about 1 µm to about 100 µm; and
an aspect ratio of from about 1.5:1 to about 4,000:1.

8. The building material according to claim 7, wherein the foam further comprises an inorganic fiber component including a plurality of inorganic fibers having:
an average length of from about 1 mm to about 50 mm; and
an average diameter of from about 1 µm to about 30 µm;
wherein the inorganic fiber component is present in the foam in an amount of from about 0.25 parts by weight to about 20 parts by weight based on 100 parts by weight of the foam; and
wherein the inorganic fiber component and the organic fiber component are present in the foam in a weight ratio of inorganic fiber component to organic fiber component of from about 1:1 to about 20:1.

9. The building material according to claim 1, wherein the textured surface further comprises a coating layer from which the plurality of particles protrude.

10. The building material according to claim 1, wherein the functional groups of the binder are isocyanates, epoxides, alcohols, amines, or carboxylic acids.

11. The building material according to claim 1, wherein the plurality of particles have an average particle size less than or equal to 1 µm.

12. The building material according to claim 1, wherein the binder is chemically bonded to the substrate via functional groups of the binder, the functional groups being isocyanates, epoxides, alcohols, amines, or carboxylic acids.

13. A composite panel comprising:
a polymeric substrate comprising a foam formed from a composition comprising at least one polyol, at least one isocyanate, and an inorganic filler; and
a first textured surface comprising a first binder and a first plurality of particles;
wherein the first binder of the first textured surface is chemically bonded to the polymeric substrate;
wherein at least a portion of the first plurality of particles is embedded in the foam, and at least a portion of the first plurality of particles protrudes from the first textured surface; and
wherein the first textured surface includes an image printed in ink thereon, the ink comprising an inorganic pigment.

14. The composite panel according to claim 13, wherein the at least one polyol comprises a highly reactive polyol having a hydroxyl number of greater than 250.

15. The composite panel according to claim 13, wherein the at least one polyol comprises a highly reactive Mannich polyol.

16. The composite panel according to claim 13, wherein the foam further comprises an inorganic fiber, an organic fiber, or a mixture thereof.

17. The composite panel according to claim 16, wherein the foam comprises a polyester fiber.

18. The composite panel according to claim 16, wherein the foam comprises a glass fiber.

19. The composite panel according to claim 13, wherein the inorganic filler of the foam comprises ash.

20. The composite panel according to claim 13, wherein the first binder is a sheet molding compound.

21. The composite panel according to claim 13, wherein the first binder comprises a thermosetting resin selected from the group consisting of an epoxy, a polyurethane, a polyisocyanurate, a polyoxybenzylmethylenglycolanhydride, a polyimide, an ethylene-vinyl acetate (EVA) copolymer, a vinyl ester, a phenolic, an acrylic, a polyester, and mixtures thereof.

22. The composite panel according to claim 13, wherein the first binder comprises a UV-curable resin.

23. The composite panel according to claim 13, wherein the first plurality of particles is selected from the group consisting of cement, stucco, clay, pulverized brick, mica, sand, limestone, calcium carbonate, quartz, fly ash, and mixtures thereof.

24. The composite panel according to claim 13, wherein the first plurality of particles have an average particle size no greater than about 10 mm.

25. The composite panel according to claim 13, wherein the first plurality of particles have an average particle size no greater than about 10 µm.

26. The composite panel according to claim 13, further comprising a second textured surface comprising a second binder and a second plurality of particles, the second plurality of particles comprising a different material than the first plurality of particles, wherein at least a portion of the second plurality of particles protrudes from the second textured surface.

27. The composite panel according to claim 13, wherein the inorganic pigment is bonded to at least a portion of the first plurality of particles.

28. A composite panel comprising:
a polymeric substrate comprising a foam formed from a composition comprising at least one polyol, at least one isocyanate, and an inorganic filler; and
a first textured surface chemically bonded to the substrate, the first textured surface comprising a first binder and a first plurality of particles having an average particle size of less than or equal to 10 µm the first textured surface including an image printed thereon with an ink comprising an inorganic pigment;
wherein the first binder of the first textured surface is chemically bonded to the polymeric substrate via functional groups of the first binder, the first plurality of particles being dispersed within the binder;
wherein the first plurality of particles has a chemical composition different from a chemical composition of the inorganic filler of the foam; and
wherein at least a portion of the first plurality of particles is embedded in the foam, and at least a portion of the plurality of particles protrudes from the first textured surface.

29. The composite panel according to claim 28, wherein the at least one polyol comprises a highly reactive polyol having a hydroxyl number of greater than 250.

30. The composite panel according to claim 28, wherein the at least one polyol comprises a Mannich polyol.

31. The composite panel according to claim 28, wherein the inorganic filler comprises ash.

32. The composite panel according to claim 28, wherein the foam further comprises an inorganic fiber, an organic fiber, or a mixture thereof.

33. The composite panel according to claim 32, wherein the foam comprises a glass fiber.

34. The composite panel according to claim 32, wherein the foam comprises a polyester fiber.

35. The composite panel according to claim 28, wherein the first binder is a sheet molding compound, the image being printed on a surface of the sheet molding compound, such that at least a portion of the ink penetrates the surface of the sheet molding compound and is disposed in the sheet molding compound.

36. The composite panel according to claim 28, wherein the first binder comprises a thermosetting resin selected from the group consisting of an epoxy, a polyurethane, a polyisocyanurate, a polyoxybenzylmethylenglycolanhydride, a polyimide, an ethylene-vinyl acetate (EVA) copolymer, a vinyl ester, a phenolic, an acrylic, a polyester, and mixtures thereof.

37. The composite panel according to claim 28, wherein the first binder comprises a UV-curable resin.

38. The composite panel according to claim 28, wherein the first plurality of particles is selected from the group consisting of cement, stucco, clay, pulverized brick, mica, sand, limestone, calcium carbonate, quartz, fly ash, and mixtures thereof.

39. The composite panel according to claim 28, further comprising a second textured surface comprising a second binder and a second plurality of particles, the second plurality of particles comprising a different material than the first plurality of particles, wherein at least a portion of the second plurality of particles protrudes from the second textured surface.

40. The composite panel according to claim 28, wherein the ink comprises at least one inorganic pigment.

\* \* \* \* \*